US005480181A

United States Patent [19]
Bark et al.

[11] Patent Number: 5,480,181
[45] Date of Patent: *Jan. 2, 1996

[54] SIDE IMPACT HEAD STRIKE PROTECTION SYSTEM

[75] Inventors: Lindley W. Bark, Chandler; Gershon Yaniv, Scottsdale, both of Ariz.; David J. Romeo, Alpine, Wyo.; Dirk J. Hardtmann, Mesa; Gregory A. Mowry, Phoenix, both of Ariz.

[73] Assignee: Simula Inc., Phoenix, Ariz.

[*] Notice: The term of this Patent shall not extend beyond the expiration date of Pat. No. 5,322,322.

[21] Appl. No.: 181,768

[22] Filed: Jan. 21, 1994

Related U.S. Application Data

[63] Continuation-in-part of Ser. No. 19,655, Feb. 19, 1993, Pat. No. 5,322,322.
[51] Int. Cl.⁶ ................................................. B60R 21/22
[52] U.S. Cl. .................... 280/730.2; 280/729; 280/743.1
[58] Field of Search ........................... 280/728 R, 728 A, 280/729, 730 A, 730 R, 743 R, 743 A, 751, 749, 748, 753, 733

[56] References Cited

U.S. PATENT DOCUMENTS 3,687,485  8/1972  Campbell .
3,844,581  10/1974  Fox .
3,866,940  2/1975  Lewis ..................................... 280/733
3,953,049  4/1976  Surace et al. ........................ 280/730 R
5,322,322  6/1994  Bark et al. ............................ 280/728 R
5,390,953  2/1995  Tanaka et al. .......................... 280/733

FOREIGN PATENT DOCUMENTS 3276844  12/1991  Japan .
2191450  12/1987  United Kingdom .
2261636  5/1993  United Kingdom .
WO9011914  10/1990  WIPO .

OTHER PUBLICATIONS

Livbag Product Brochure, "Specifications for Euroflator Gas Generator and Safety Data Sheet," Aug., 1992.

Primary Examiner—Eric D. Culbreth
Attorney, Agent, or Firm—Crowell & Moring

[57] ABSTRACT

The present invention is a tubular structure which inflates upon side or oblique vehicle impact to protect the occupants of a vehicle such as an automobile. The structure is mounted in its undeployed state along the periphery of the vehicle's side pillars and roof rail. The primary component of the present invention is a braided tube linked to a gas generator. When a side impact is detected, the gas generator is ignited, inflating the braided tube. As the braided tube inflates, the diameter of the tube increases and its length decreases. The tube then pulls out of its storage location and forms a taut, semi-rigid structural member across the vehicle's side window.

50 Claims, 9 Drawing Sheets

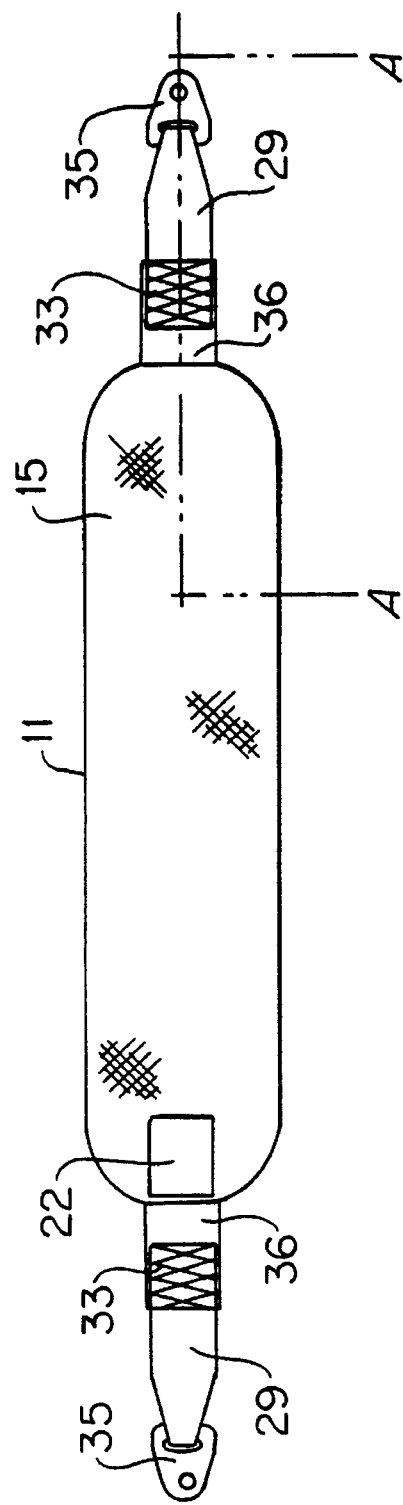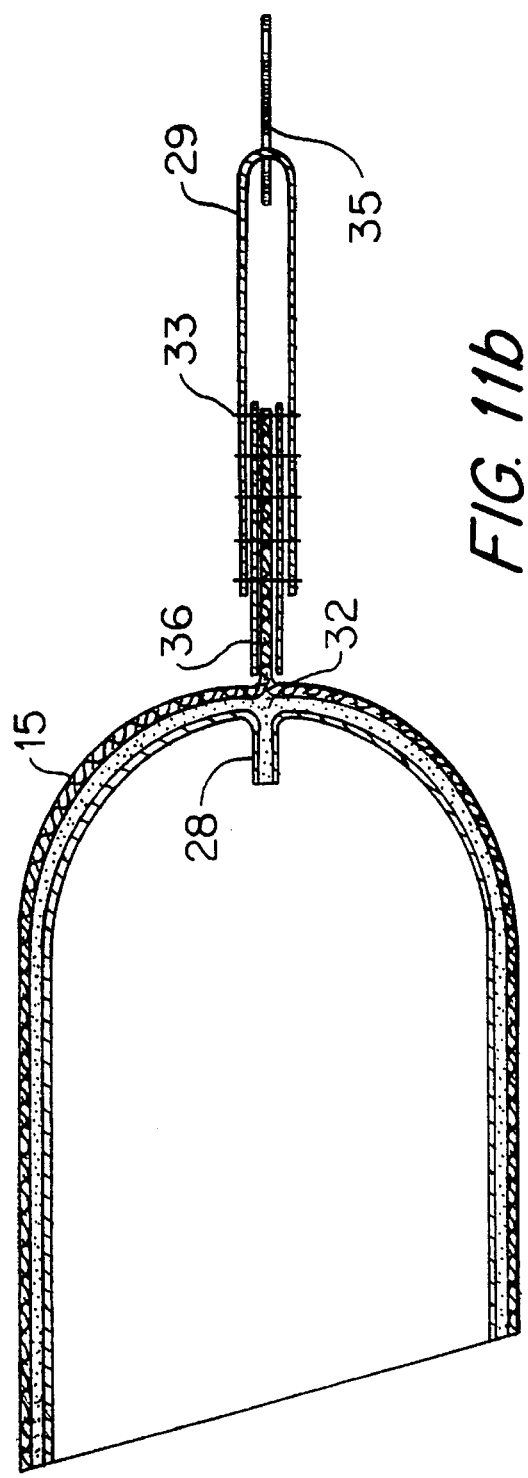
FIG. 11a
FIG. 11b

SIDE IMPACT HEAD STRIKE PROTECTION SYSTEM

This application is a continuation-in-part of application Ser. No. 08/019,655, filed on Feb. 19, 1993, now U.S. Pat. No. 5,322,322, which is incorporated by reference herein.

BACKGROUND

1. Field of the Invention

The present invention relates to safety apparatus for protecting the occupant of a motor vehicle from injuries that could be sustained during a side impact or roll over crash. More specifically, it relates to a system of components that inflate to protect and/or cushion the head and neck from direct impact with the interior vehicle structure or exterior structure of the impact object.

2. Background of the Invention

Side or lateral impacts are a leading cause of injuries and fatalities in automotive crashes. According to the Insurance Institute for Highway Safety (IIHS), 30 percent of all automobile occupant fatalities in the United States in 1989 involved side impact crashes.

Occupants killed in side impact crashes typically have a high incidence of head and neck injuries. Side impact crashes also cause severe injuries to other body regions including the chest, abdomen, pelvis and extremities. FIG. 1 summarizes the distribution of injuries by body region, based on an IIHS study of 91 struck-side and 49 opposite-side fatalities in the United Kingdom in 1985. FIG. 1 shows the distribution of injuries having a severity greater than or equal to three on the Abbreviated Injury Scale (AIS) by body region for fatalities in struck-side and opposite-side crashes. "Struck-side" refers to occupants seated on the side of the vehicle that was struck, while "opposite-side" refers to occupants who were seated on the side that was not struck. According to the IIHS study, 64% of struck-side occupants suffered head injuries; 12% suffered neck injuries; 85% suffered chest injuries; 26% suffered pelvis injuries; 2% suffered injuries to their upper limbs and 21% to their lower limbs; and 59% suffered abdomen injuries. FIG. 1 also shows that 82% of opposite-side occupants suffered head injuries; 20% suffered neck injuries; 73% suffered chest injuries; 14% suffered pelvis injuries; 10% suffered injuries to their upper limbs and 12% suffered injuries to their lower limbs; and 49% suffered abdomen injuries. FIG. 1 shows that serious head and neck injuries can occur in either seating position.

Conventional automotive safety belt and air bag systems offer inadequate protection to the head and neck in side impact crashes. These systems are generally designed to protect occupants from primary injuries sustained only in frontal impacts, or in oblique impacts up to approximately +/−30 degrees.

Federal Motor Vehicle Safety Standard (FMVSS) 214 currently defines the test procedures and performance requirements for occupant protection in side impact crashes. The dynamic requirements of FMVSS 214 are scheduled to be phased into practice based on an escalating percentage of each manufacturer's annual production starting Sep. 1, 1993.

In response to FMVSS 214, several developments in side impact countermeasures have occurred. These countermeasures primarily include the reinforcement of side components and door structures with improved door beams, modified pillars, and improved energy-absorbing door padding. All of these developments in response to FMVSS 214 focus on limiting the intrusion of an object into the passenger compartment. Additionally, energy-absorbing padding helps distribute the impact force to the struck-side occupant over a larger surface area. An excellent production example of these technologies is the side impact protection system incorporated into current Volvo automobiles which carries door beam loads through the front seats into the center tunnel structure.

Another countermeasure recently being considered by several vehicle manufacturers are air bags that deploy from the door panel or seat to provide protection for the thorax, abdomen and pelvic regions. These systems help distribute the impact force over a larger body surface area to reduce the extent and severity of injuries sustained during a side impact crash. However, these systems are not expected to provide significant protection to the head, face and neck. Therefore, as increasing numbers of vehicles are equipped with these countermeasures, head injuries will likely emerge as the predominant injury in all side impact crashes.

There are three major causes of head, neck, and face injuries in side impact crashes:

(1) The head and neck regions strike the upper interior side components of the vehicle. These components include the A and B-pillars, the roof rail and the upper door frame. FIG. 2 shows the relative positions of A-pillar 20, B-pillar 21, roof rail 23, and upper door frame 25.

(2) The head and neck regions collide with the striking (or struck) object.

(3) The head flailing through the window frame. Typically, the side window is shattered early in the impact, and is therefore not a strike hazard. However, the head of the occupant is not restrained inside the passenger compartment. Moreover, the window cannot be used as a load bearing surface for a conventional type of air bag.

In light of these potential dangers, an effective side impact head and neck protection system must prevent or cushion the head from directly colliding with the upper side components of a vehicle, cushion or prevent the head and neck from directly being impacted by the striking or struck object, and restrain the head inside the confines of the vehicle.

SUMMARY OF THE INVENTION

The present invention comprises a system of inflatable structural component(s) integrated into a vehicle in the region of the vehicle's A and B-pillars and roof rail. The present invention can be installed during manufacture, or retrofitted into most in-service vehicles. It is intended to be used in addition to conventional automotive safety belts.

The primary component of the invention is an inflatable tubular structure that inflates upon side or oblique impact to become an additional structural member of the vehicle. The tubular structure extends diagonally from the A-pillar to (or just behind) the B-pillar spanning the side window opening. Depending upon the geometry of the vehicle, the system can employ either a single or a double tubular structure.

In the undeployed position, the tubular structure is stowed in the A-Pillar, roof rail, and B-pillar areas. A pivotable mount and/or an attachment strap is used to attach one end of the structure (or a point near the end of the structure) to the B-pillar (or to the roof rail, slightly aft of the B-pillar) and the other end to the A-pillar. The tube is a braided tube made of continuous fibers impregnated with an elastomer. In order to provide superior gas-retention, the tube may contain an additional internal bladder. As the braided tube inflates, the diameter of the tube increases while its length decreases significantly. As the length of the inflating structure contracts, the mounts pivot inward toward the window opening. This allows the inflated tubular structure to pull out of its storage location and form an essentially straight line between its two anchor points. The tubular structure thereby forms a taut, semi-rigid structural member across the window opening.

The inflatable tubular structure is connected to one or more crash sensor(s). When a collision occurs, the crash sensor(s) send(s) a signal to the gas generator, igniting the generator propellant, and thus inflating the tubular structure. The gas generator can be internally or externally integrated into the tubular structure, or it can be remotely located within the vehicle structure.

As the generated gas inflates the tubular structure, it deploys or pulls out from its stowed position. When fully inflated, the tubular structure provides side impact strike protection for the head, neck and face, and prevents the head from flailing outside. The system may additionally help prevent unrestrained occupant ejection and provide head and neck protection in oblique impact crashes and in rollover accidents.

The inflatable tubular structure is not an air bag in the conventional sense. It operates at pressures higher than the pressures used in conventional automotive air bags, it is not vented after deployment, and it retains its position and rigidity through tensile forces throughout the crash event and for a significant time thereafter. Even after the gas has cooled, the structure remains sufficiently inflated to provide continuous protection for possible additional impacts during an accident. Because it retains its rigidity and position through tensile forces, it does not require a bearing surface. It also does not require a storage cover, and does not need to be multiply folded in the undeployed state as does a conventional air bag.

The primary function of the tubular structure is to prevent the occupant's head and neck from colliding with interior vehicle components (e.g., the A and B-pillars, or the roof rail). The structure also cushions the impact between the occupant's head and the striking or struck object, and serves as a structural barrier that may limit the intrusion of the striking or struck object into the passenger compartment through the window. The tubular structure also prevents the occupant's head from flailing through the window and may additionally prevent the ejection of an unrestrained occupant.

Accordingly, it is an object of the present invention to provide protective apparatus, used in conjunction with conventional safety belts, that inflates to protect the head and neck of an occupant of a vehicle in a side impact crash.

It is another object of the present invention to provide an inflatable structural member that restrains the occupant from flailing through, or being ejected through, the window.

It is another object of the present invention to provide an inflatable structural member that may help prevent the struck or striking object from entering the vehicle through the side window opening.

It is another object of the present invention to provide a system of inflatable components that are not vented and are at high pressure to provide continuous protection for possible additional impacts or roll over during an accident.

It is another object of the present invention to provide a system of inflatable components integrated into the vehicle body, providing uninhibited entry, exit, and operation of the vehicle.

These and other objects of the present invention are described in greater detail in the detailed description, the appended drawings, and the attached claims.

BRIEF DESCRIPTION OF THE DRAWINGS

FIG. 11a shows a side view of a preferred method of sealing and finishing the ends of the braided tube structure of the present invention.

FIG. 11b is an enlarged cross-sectional view of FIG. 11a taken through line A—A.

DETAILED DESCRIPTION OF THE INVENTION

Figure 1:
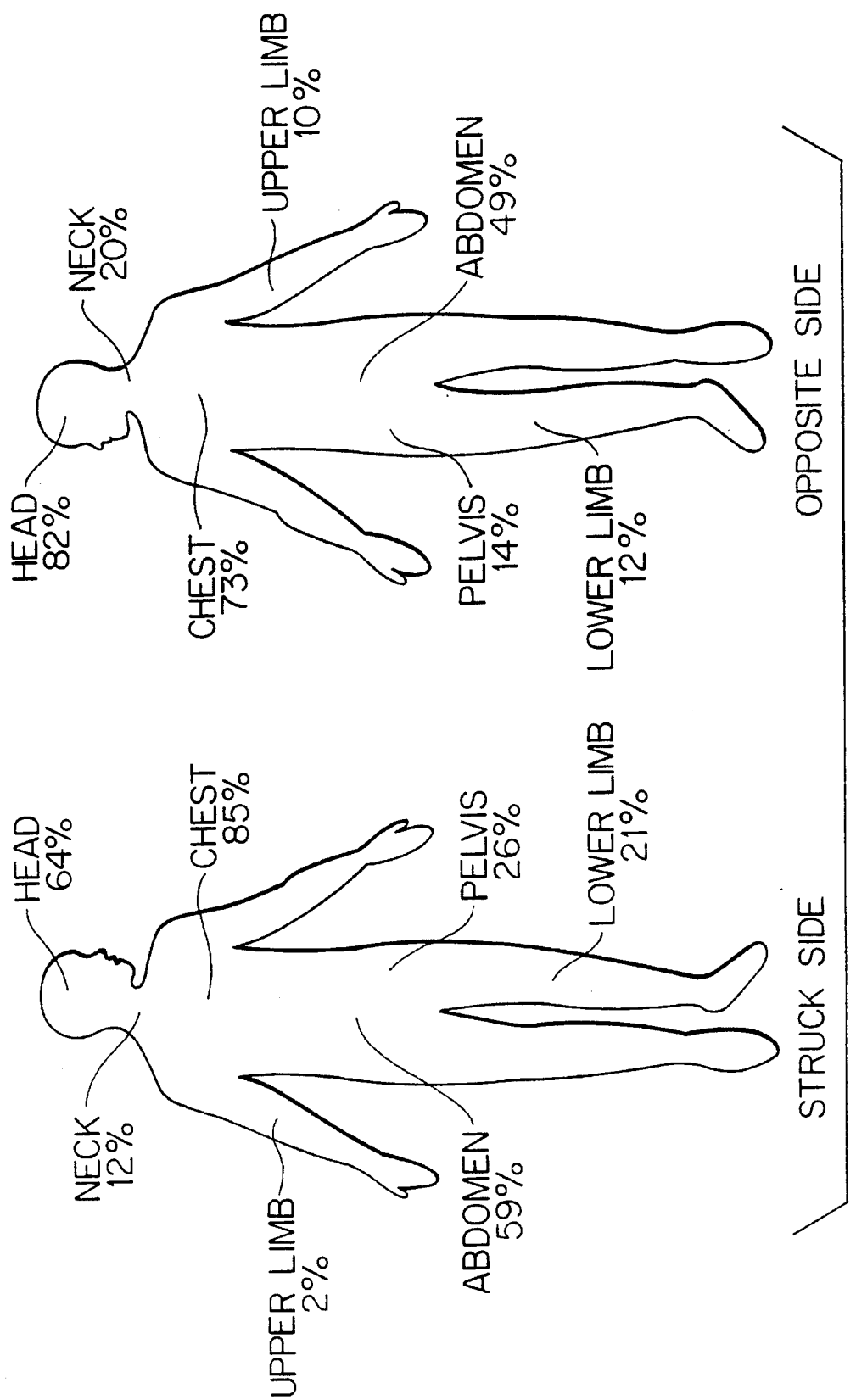
FIG. 1 shows the distribution of injuries by body region for struck side and opposite side crashes using the Abbreviated Injury Scale (AIS).
Figure 2:
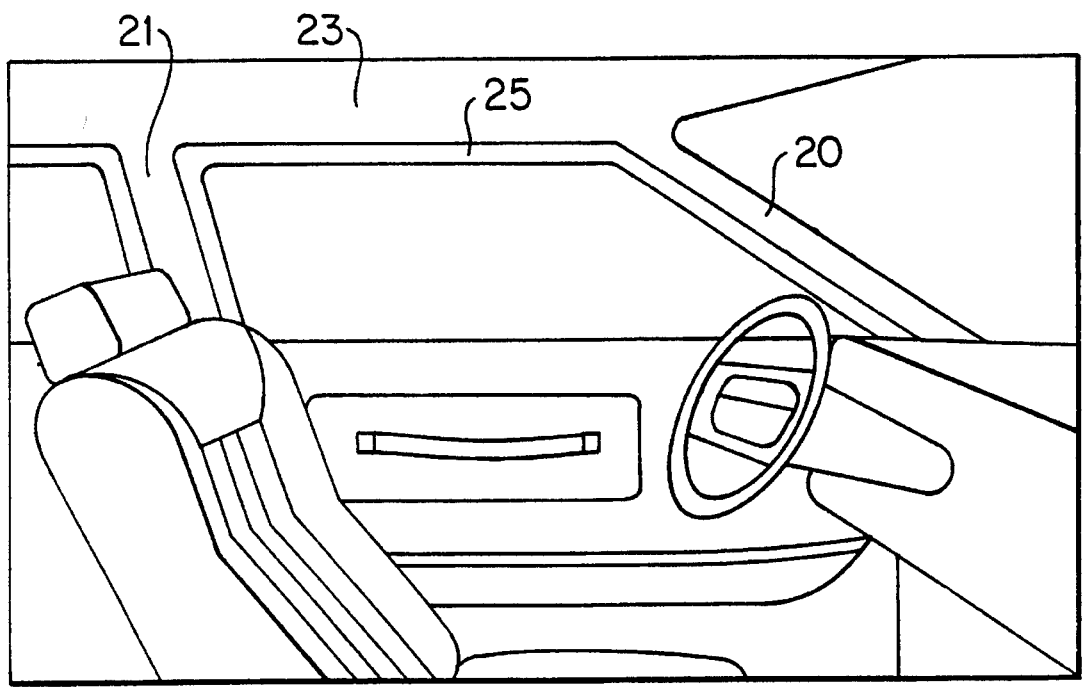
FIG. 2 shows a partial side view of the interior of a typical automobile.
Figure 3A:
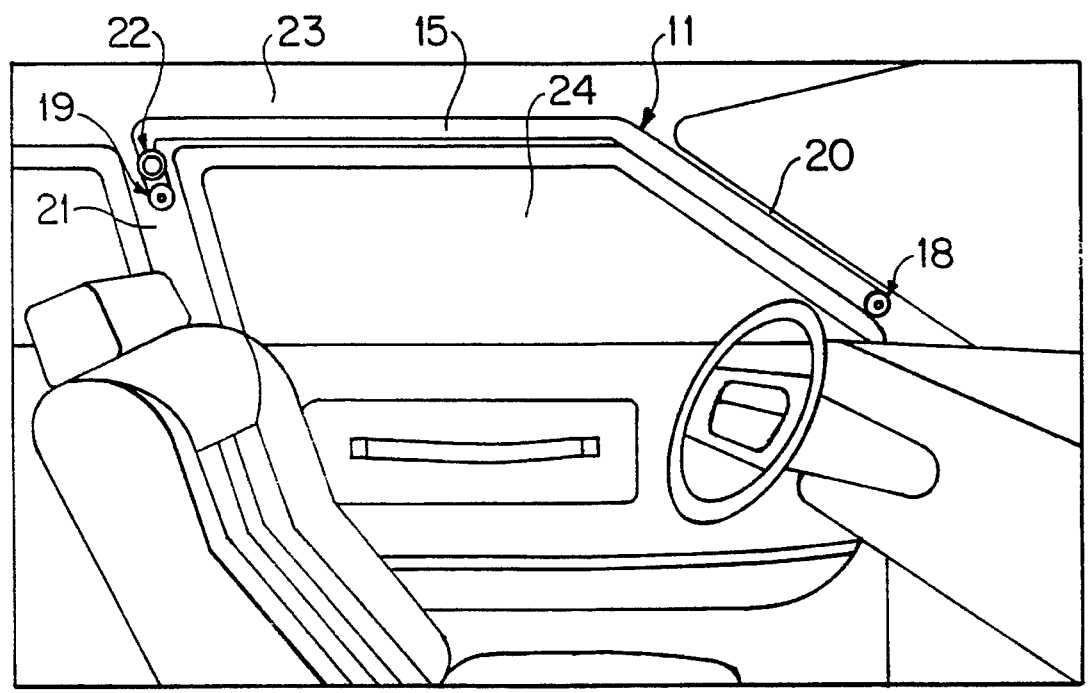
FIG. 3a shows the present invention in the undeployed configuration installed in a typical automobile.
Figure 3B:
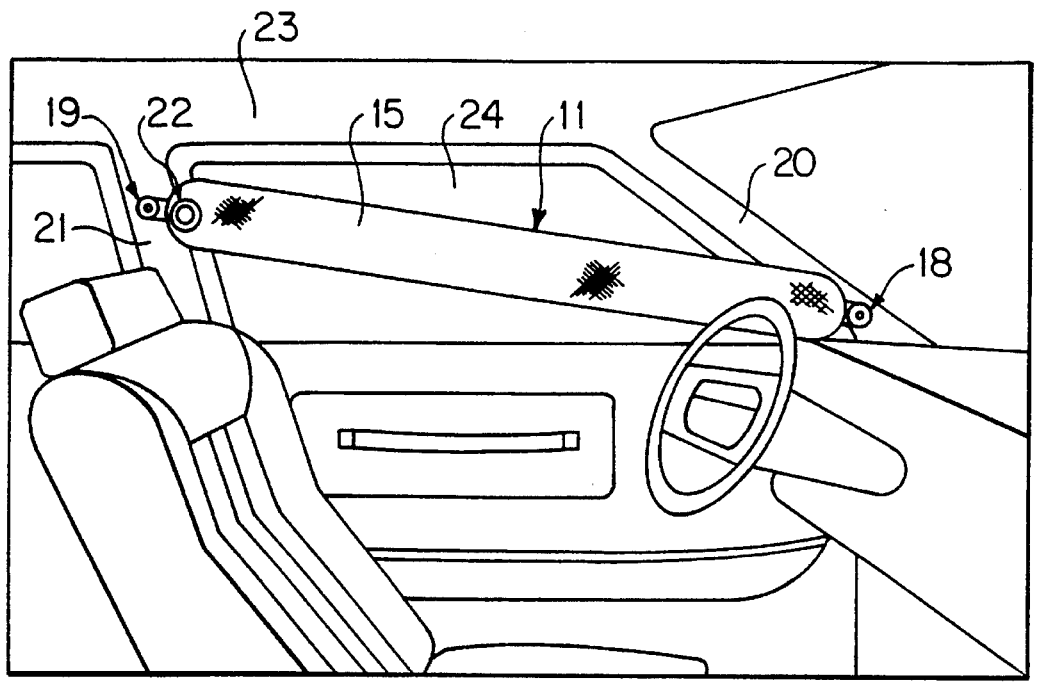
FIG. 3b shows a first preferred embodiment of the present invention after deployment.
Figure 3C:
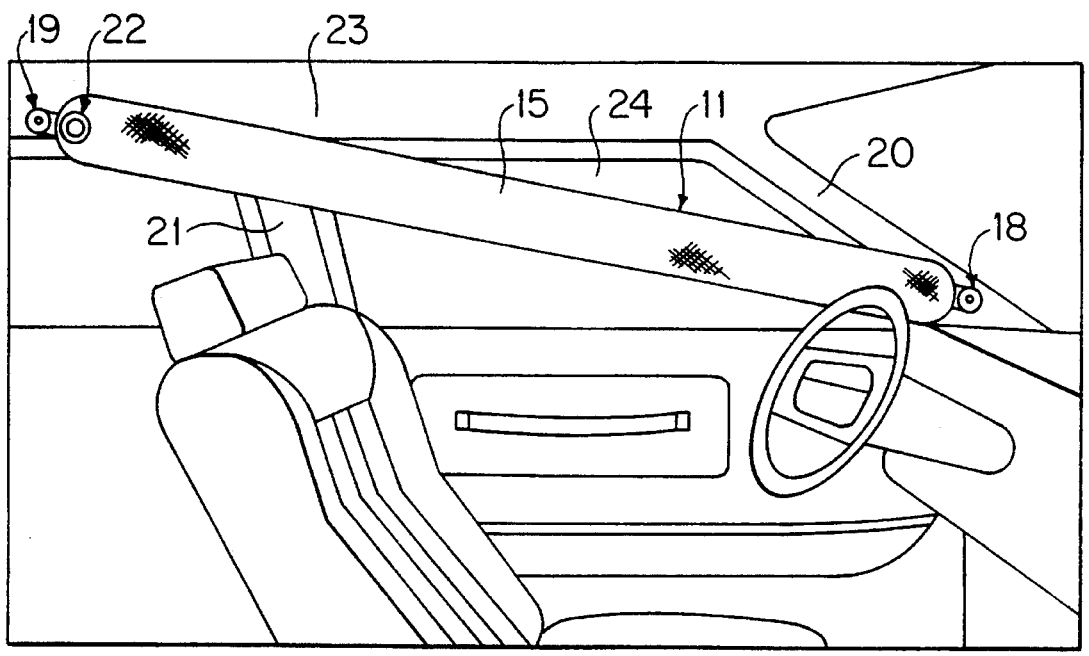
FIG. 3c shows a an alternate position for the tubular structure of the present invention after deployment.

The first preferred embodiment of the present invention is shown in the uninflated and inflated configurations in FIGS. 3a and 3b, respectively. FIG. 3c shows an alternate position for the present invention. FIGS. 3a–3c show the present invention as it would be installed in a typical automobile.

Figure 4B:
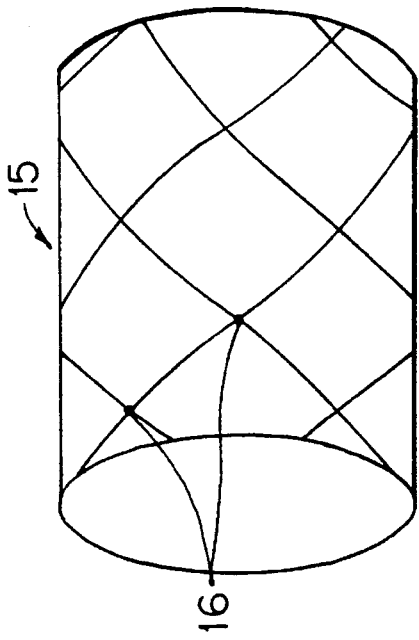
FIG. 4b shows the braided tube of the inflatable tubular structure in the inflated state.
Figure 4A:
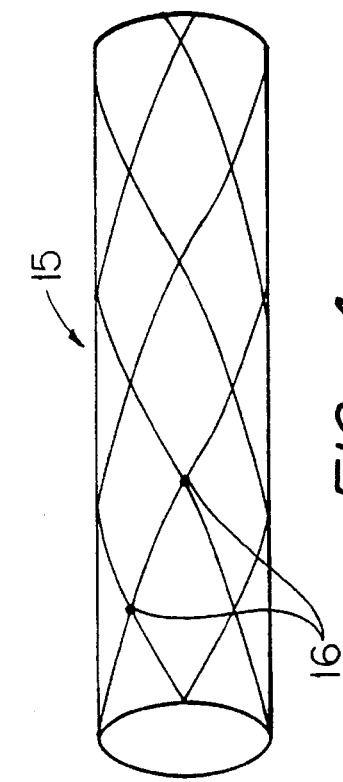
FIG. 4a shows the braided tube of the inflatable tubular structure in the uninflated state.

The principal component of inflatable tubular structure 11 is braided tube 15 which is shown in detail in FIGS. 4a and 4b. Braided tube 15 is made of continuous fibers impregnated with an elastomeric material, preferably silicone rubber. Typical fiber materials include Kevlar™, nylon, dacron and polyester fibers. In the unloaded position shown in FIG.

4a, braided tube 15 is elongated with its woven fibers forming obtuse and acute angles at the fiber crossing points 16.

When inflation begins, the tube fibers seek an orientation that allows a larger volume within the tube. FIG. 4b shows that braided tube 15 shortens in length, while its diameter increases. The braid fibers ultimately seek an orientation in which the acute angles at crossing points 16 become obtuse angles and the obtuse angles at crossing points 16 become acute angles. As the inflatable tubular structure 11 inflates, the elastomeric material of braided tube 15 will distort to accommodate the change in fiber orientation. The tube diameter increases, while the tube length decreases by as much as 50% when the tube is unconstrained. The preferred range for unconstrained decrease of the tube length is 20% to 50%. The actual range used in a specific application depends upon the geometry of the vehicle and the configuration of the tubular structure prior to and after deployment.

Upon inflation, braided tube 15 becomes a semi-rigid structure that can withstand a range of external forces. Unlike air bags which are inflated to a pressure just above one bar, the tubular structure is inflated to 2–6 bars, preferably 3–5 bars, and possibly higher. The load-bearing capability of braided tube 15 depends upon a number of factors, such as tube dimension and internal pressure. The cross section may also be non-uniform in order to tailor braided tube 15 for a specific load or packaging profile.

FIGS. 3a and 3b show inflatable tubular structure 11 installed in the interior of a vehicle. The two ends of braided tube 15 are attached to A and B-pillars 20 and 21 (or to A-pillar 20 and roof rail 23) by pivotable mounts 18 and 19. Gas generator 22 is shown attached to braided tube 15 at the B-pillar end. However, it can be integrated at any point along or inside tube 15, or it can be remotely mounted within the vehicle. The preferred location of gas generator 22 is inside braided tube 15, attached at a point near either tube end (as shown in FIG. 11a).

Figure 13:
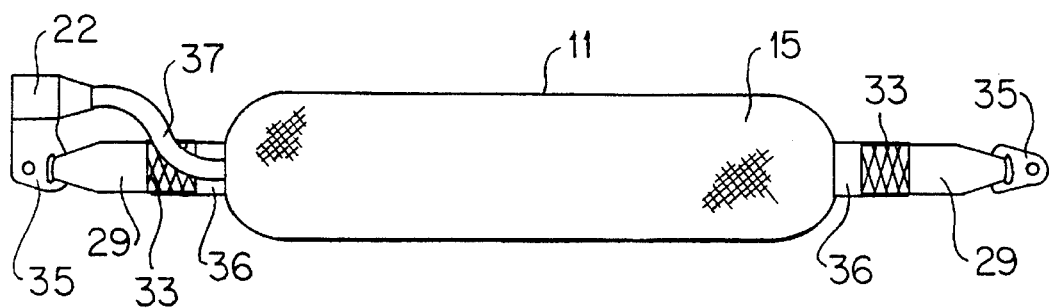
FIG. 13 shows an alternative position for the gas generator of the present invention.

FIG. 13 shows an alternative preferred location for gas generator 22. As shown by FIG. 13, gas generator 22 can be located externally to braided tube 15. Gas generator 22 is mounted on fixture 35, which may also be used to attach one end of tubular structure 11 to the vehicle. Gas generator 22 may also be directly mounted to the vehicle. Thermally resistant tubing 37 provides a fluid path from gas generator 22 to tubular structure 11.

The external placement of gas generator 22 may offer significant advantages during manufacturing, assembly or packaging of the present invention. For example, it may allow the gas generator to be installed later in the manufacture. It also allows gas generator 22 to be covered with acoustical damping material, to reduce the noise level in the vehicle.

FIG. 3a shows inflatable tubular structure 11 in the uninflated state. It follows the contours of A-pillar 20, roof rail 23, and B-pillar 21. In the case where braided tube 15 is attached to A-pillar 20 and roof rail 23, the uninflated tube follows the contours of the A-pillar 20 and the roof rail 23. The stowed structure can lay flat or be folded against the vehicle molding, or it can be integrated into the molding. Inflatable tubular structure 11 may also be concealed by a cover, such as a protective sleeve with a weak seam. Pivotable mounts 18 and 19 and gas generator 22 may also be concealed by a cover, or integrated into the vehicle molding or structure.

As gas flows into the chamber of braided tube 15, the internal pressure increases the tube diameter and decreases the tube length. However, pivotable mounts 18 and 19 prevent the ends of the tube from moving. Thus braided tube 15 pulls itself out of its stowed position. Pivotable mounts 18 and 19 then pivot inward toward the center area of window opening 24. When tubular structure 11 is fully inflated, it deploys to form a straight line between mounts 18 and 19. A typical tube 15 would have an inflated diameter of approximately 4 to 8 inches and an internal pressure of about 3 bars.

It is important to note that, in the preferred embodiment of the invention, the braided tube's "natural length" or unconstrained length upon inflation would be less than the straight-line distance between pivotable mounts 18 and 19. Thus mounts 18 and 19 prevent the shortening of tube 15, i.e., the tube after inflation and deployment is under tensile loads reacted by mounts 18 and 19.

FIG. 3b shows tubular structure 11 in the deployed state with braided tube 15 spanning window opening 24 diagonally. Deployed tubular structure 11 forms a semi-rigid structural member between A and B-pillars 20 and 21. Tubular structure 11 prevents the occupant's head from colliding with interior vehicle, components or from flailing through window opening 24, may limit the intrusion of the striking or struck object, and reduces the possibility of the ejection of an unrestrained occupant through the side window. FIG. 3c shows braided tube 15 in an alternate position, with the rear end of the tube attached to the roof rail, preferably behind the B-pillar. The preferred position for mount 19 depends upon the configuration and geometry of a particular vehicle.

Figure 5A:
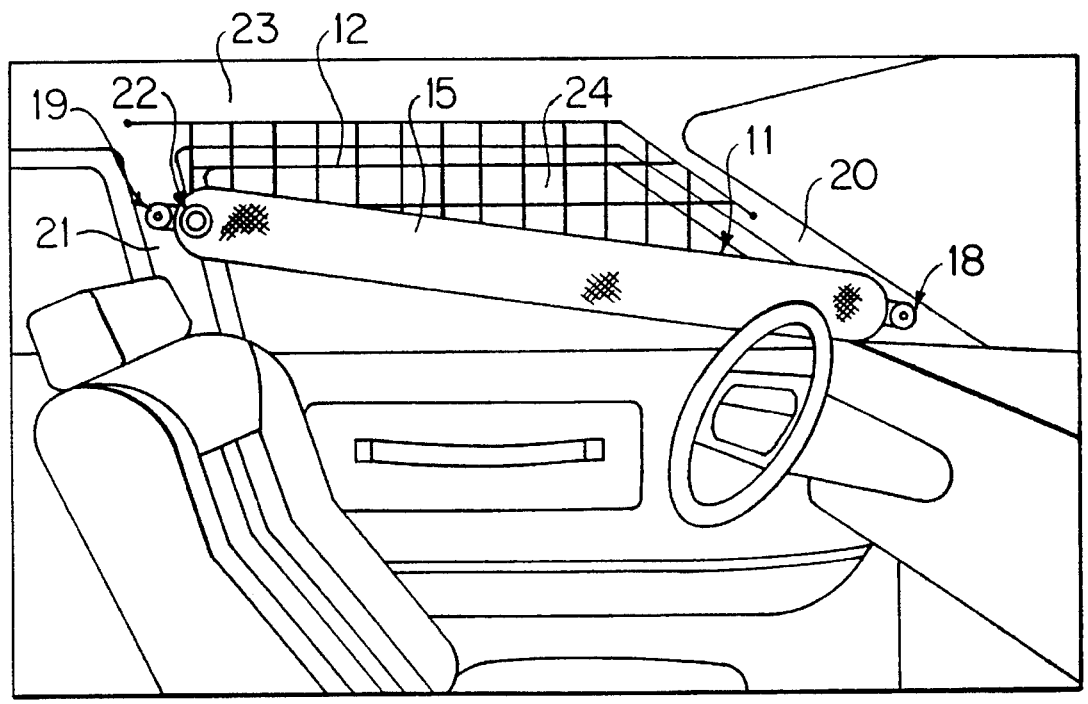
FIG. 5a shows the present invention with an optional netting feature.
Figure 5B:
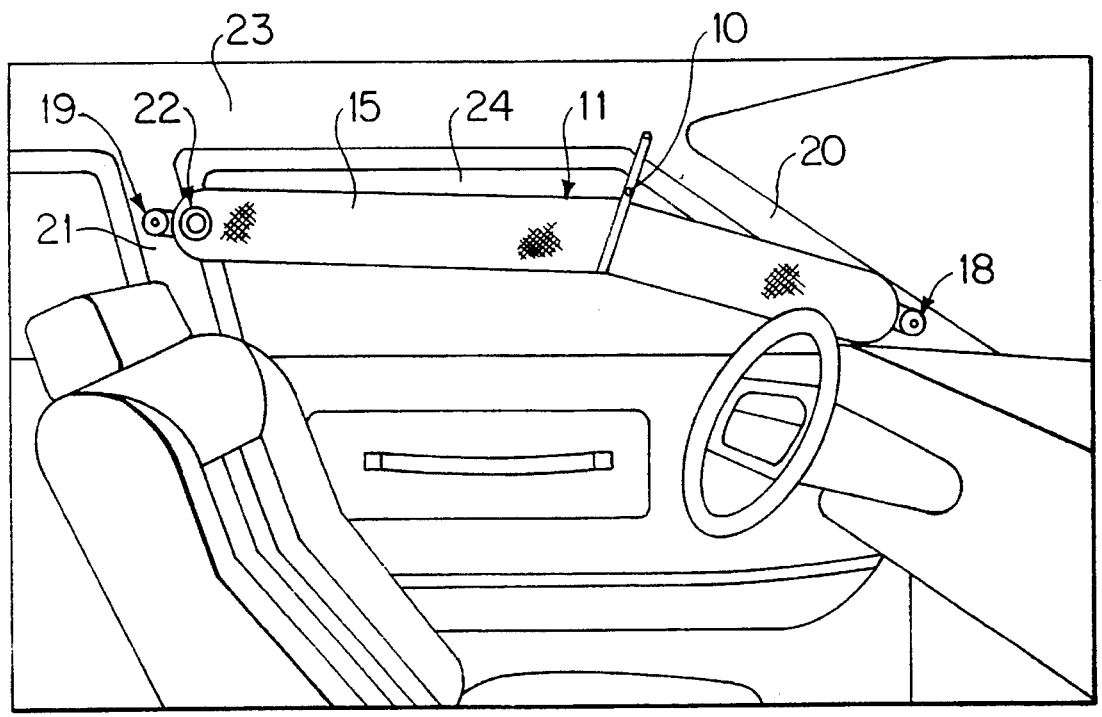
FIG. 5b shows the present invention with an optional alignment feature.

Occupant ejection could be further prevented by including optional net material 12 between roof rail 23 and tubular structure 11, as shown in FIG. 5a. The net could be attached to roof rail 23 and braided tube 15, so that it would deploy along with tubular structure 11. In the deployed position the net would provide a mesh barrier in the upper portion of the window opening between roof rail 23 and the inflated tubular structure 11. Additionally, the net could be used to modify or customize the alignment of deployed tubular structure 11. The net could hold the tube closer to the roof rail in critical head impact areas. FIG. 5b shows that tube alignment could also be modified using one or more straps 10, instead of net material 12.

Gas generator 22, shown in FIGS. 3a and 3b, is connected to a crash sensor (not shown). When the crash sensor detects an impact, it sends a signal to the initiator in gas generator 22. The initiator then ignites the generator propellant, thus producing a gas that inflates braided tube 15.

The gas generators used in the invention are preferably similar to those currently used in automotive air bags in Europe. These generators are small enough to be contained within the inflatable tube. For example, the gas generator used in the Livbag "Euroflator" air bag has a diameter of 38 mm and a length of 35 mm, and a weight of 175 grams. Gas generators preferred for this invention must fully inflate the tubular structure to pressures of more than one bar within 10 to 30 milliseconds.

Unlike conventional automotive air bags, tubular structure 11 is not vented and remains sufficiently inflated to provide continuous protection from any subsequent impacts during a crash. Additionally, since the inflatable tubular structure is initially inflated to 2–5 bars, it will still remain taut even after the gas has cooled. A conventional air bag, even unvented, will not retain its shape for more than a few hundred milliseconds due to gas cooling.

Figure 6A:
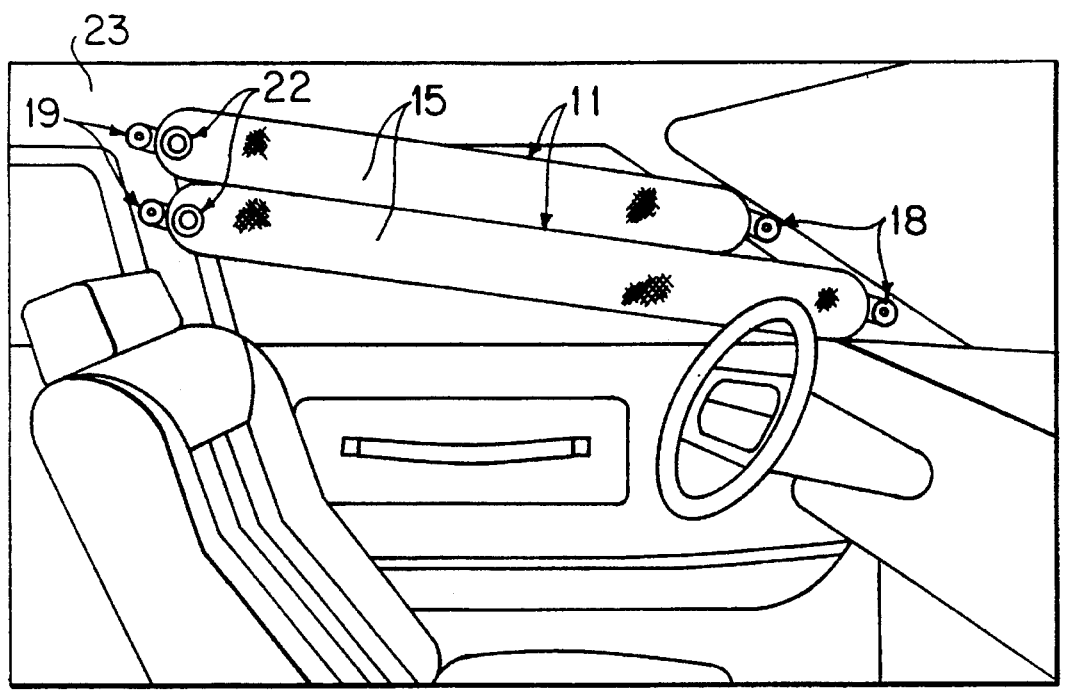
FIG. 6a shows a second preferred embodiment of the present invention with a double tubular structure.
Figure 6B:
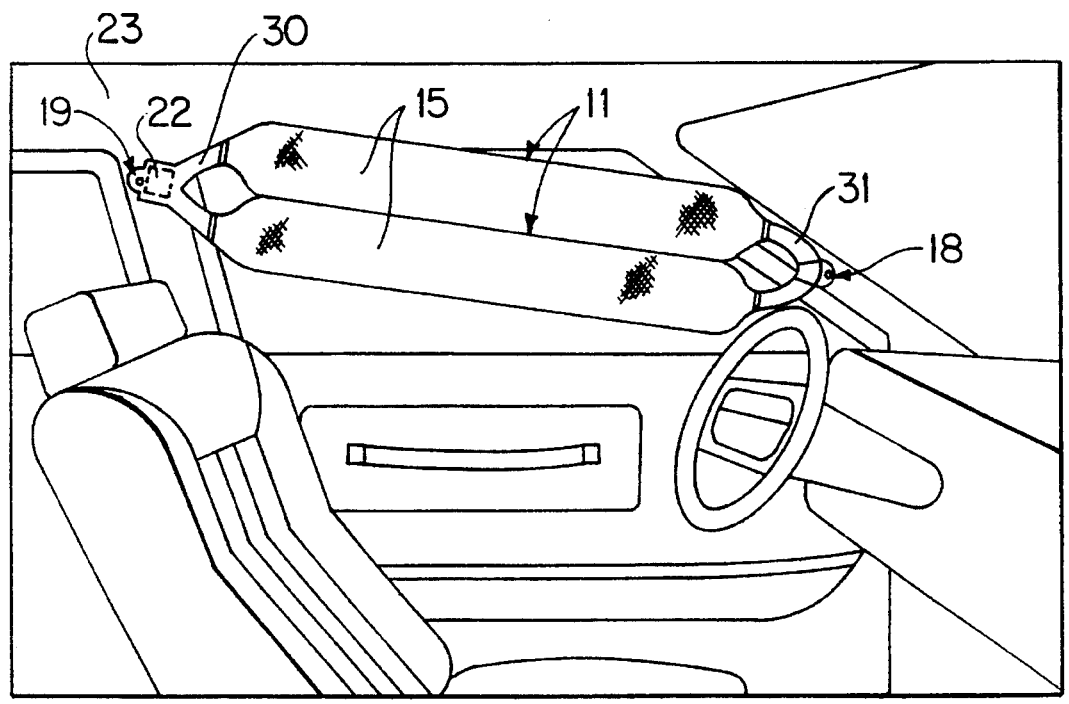
FIG. 6b shows the second preferred embodiment with a fluid connection between the first and the second tubes.

A second preferred embodiment of the present invention is shown in FIG. 6a and 6b. The second embodiment is similar to the first embodiment, but uses a pair of tubular structures instead of a single tube. The additional tube can be added slightly above the original tubular structure to provide additional protection for the head, neck and face regions. Tubular structures 11 can be separated or joined, as vehicle geometry dictates. Tubular structures 11 can be installed individually, by two pairs of pivotable mounts as shown in FIG. 6a, or by a single pair of pivotable mounts as shown in FIG. 6b. FIG. 6b shows the double tubular structure of the second embodiment, with fluid connections 30 and 31 between the first and second tubes (at each end) and a single pair of pivotable mounts 18 and 19.

In the example shown in FIG. 6b, the first and second tubes are simultaneously inflated by a single gas generator 22 that is connected to the first and second tubes by fluid connection 30 that also serves as a split housing.

The gas pressure in the first and second tubes is equalized by gas passing through fluid connections 30 and 31. Although FIG. 6b shows a pair of fluid connections, a single fluid connection between the first and second tubes is also possible.

Figure 9:
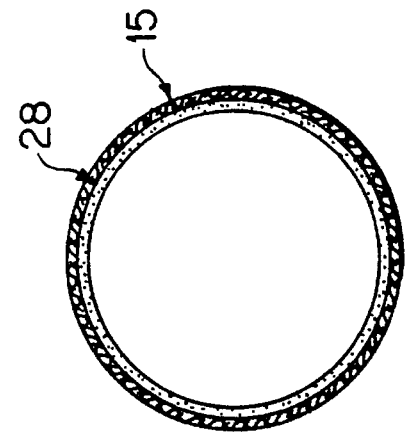
FIG. 9 is a cross-sectional view of a third preferred internal embodiment of the braided tube of the present invention having a seamless inner bladder.
Figure 8:
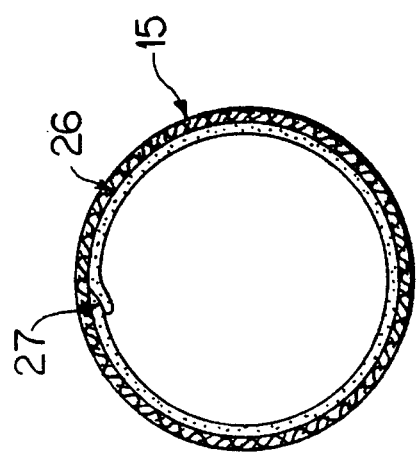
FIG. 8 is a cross-sectional view of a second preferred internal embodiment of the braided tube of the present invention having a seamed inner bladder.
Figure 7:
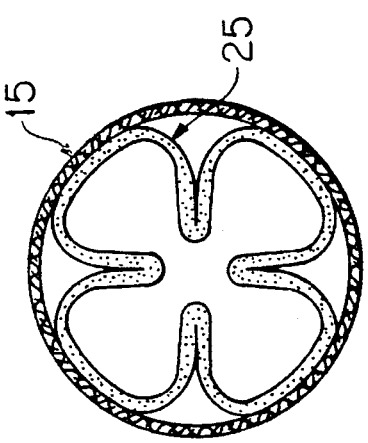
FIG. 7 is a cross-sectional view of a first preferred internal embodiment of the braided tube of the present invention having an inner bladder.

FIGS. 7, 8 and 9 show cross-sectional views of three preferred internal embodiments of braided tube 15 of the present invention. As shown in FIG. 7, the first preferred internal embodiment of braided tube 15 includes an inner bladder 25 that is made of gas-retentive fabric or material, such as a material or fabric singly or doubly coated with silicone, neoprene or urethane. Inner bladder 25 is connected to gas generator 22 (shown in FIGS. 3a–3c) and can be attached to the inner surface of braided tube 15 by adhesive bonding in several places. Portions of inner bladder 25 may be reinforced with one or more layers of material, such as elastomeric material, to provide additional impact, penetration, and thermal resistance to the gas generator(s) output flow. The inflation of braided tube 15 is accomplished by the full or partial inflation of inner bladder 25. Specifically, the generated gas inflates inner bladder 25, thus causing an internal pressure that inflates braided tube 15. Due to diameter restrictions imposed by the high-strength fibers of braided tube 15, inner bladder 25 may or may not be permitted to fully inflate. Inner bladder 25 may or may not include a seam running the length of the bladder structure.

FIG. 8 shows a second preferred internal embodiment of braided tube 15 of the present invention. This internal embodiment is similar to the first preferred internal embodiment, but uses a seamed inner bladder 26. Seamed inner bladder 26 is constructed of one or more layers of gas-retentive elastomeric material, preferably silicone, with a bonded seam 27 running the length of the bladder. Unlike the inner bladder of the first internal embodiment, seamed inner bladder 26 is uniformly bonded to the inner surface of braided tube 15 by adhesive (not shown).

A third preferred internal embodiment of braided tube 15 of the present invention is shown in FIG. 9. This internal embodiment is similar to the second preferred internal embodiment, but uses a seamless inner bladder 28 instead of a bladder with a seam.

The preferred method for sealing and finishing the ends of the braided tube 15 of the present invention is shown in FIGS. 11a and 11b. FIG. 11a shows a side view of braided tube 15 in its inflated state. FIG. 11b shows an enlarged cross-sectional view of FIG. 11a taken through line A—A. As shown in FIG. 11b, braided tube 15 includes inner bladder 28 of the third preferred internal embodiment, however, inner bladder 25 or 26 (shown in FIGS. 7 and 8, respectively) can be substituted in its place.

As shown in FIG. 11b, the ends of internal bladder 28 are turned inward and flattened, essentially forming an upper and lower layer that are sealed together by adhesive 32. The ends of braided tube 15 are brought together and flattened, essentially forming an upper and lower surface which are bound together by stitching 33. The end of braided tube 15 is preferably wrapped with one or more layers of reinforcing fabric tape 36 to prevent fraying. An additional layer (or layers) or durable webbing 34 is stitched to the wrapped tube end to facilitate connection to the vehicle. Finally, as shown in FIG. 11a and 11b, attachment hardware 35 is added at the end of webbing 34 for connection to pivotable mounts 18 or 19 (shown in FIG. 3b).

The preferred closure and finishing method shown in FIGS. 11a and 11c helps inflatable tubular structure 11 maintain its essentially air-tight character and provides adequate load transmission between braided tube 15 and the vehicle.

Figure 10A:
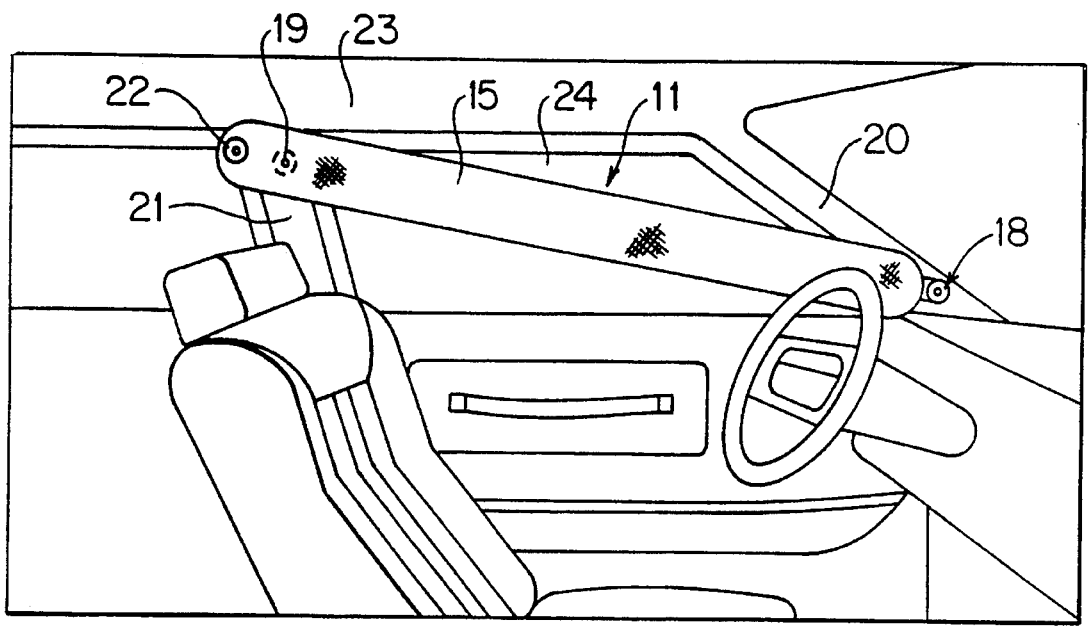
FIG. 10a shows a third preferred embodiment of the present invention.
Figure 10B:
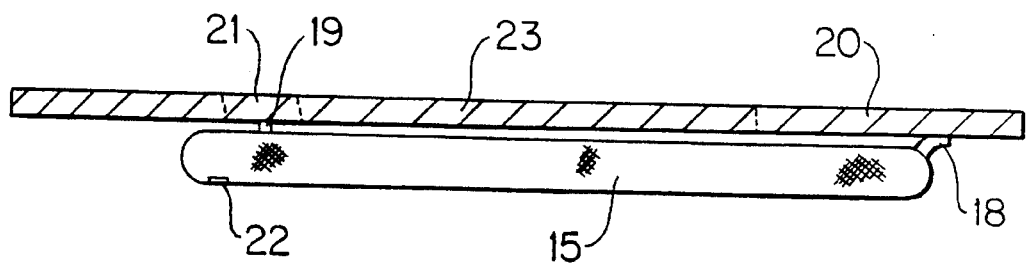
FIG. 10b is a top view of the third preferred embodiment of the present invention.

A third preferred embodiment of the present invention is shown in FIGS. 10a and 10b. This preferred embodiment is similar to the first embodiment, but the second end of tubular structure 11 is attached to B-pillar 21 at a location spaced away from the end of braided tube 15 rather than at the tube end. As shown in FIGS. 10a and 10b, braided tube 15 is attached to B-pillar 21 by pivotable mount 19 which is located at a point along the tube, slightly forward of the aft tube end. This attachment configuration can be used in conjunction with the three preferred internal embodiments of braided tube 15.

Figure 12:
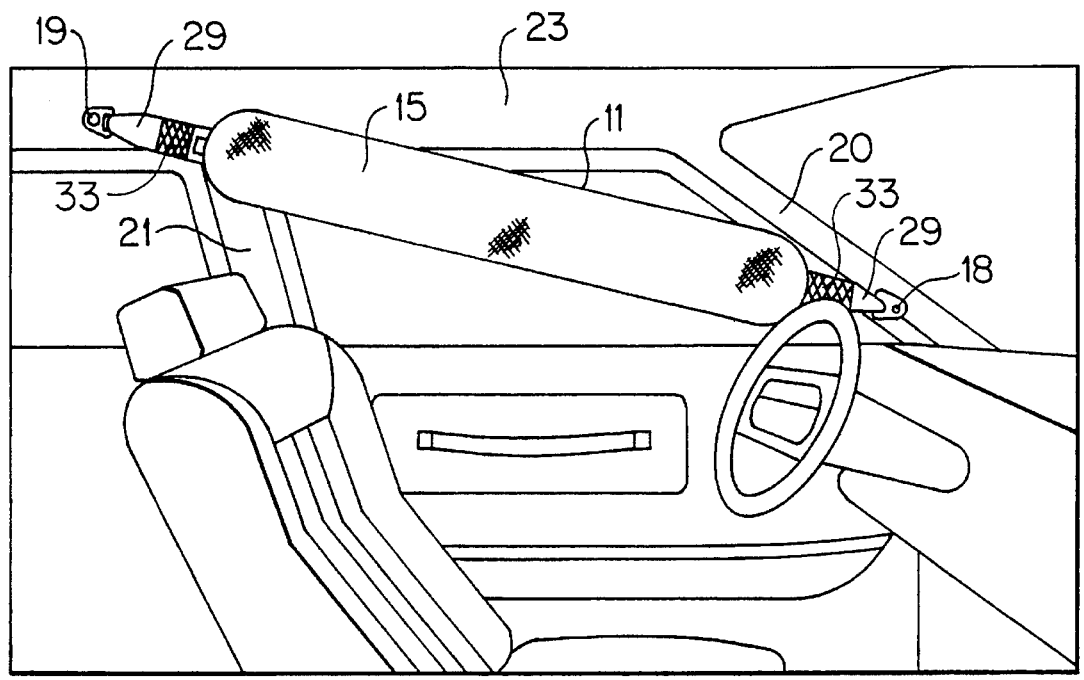
FIG. 12 shows a fourth preferred embodiment of the present invention.

A fourth preferred embodiment of the present invention is shown in FIG. 12. This embodiment is similar to the first embodiment, but uses attachment straps 29 to fasten inflatable tubular structure 11 to A-pillar 22 and to roof rail 23 (or to B-pillar 21, depending upon the configuration of the car). Attachment straps 29 are preferably made of a durable webbing material. As shown in FIG. 12, one end of attachment strap 29 is connected to an end of braided tube 15 by some permanent means, such as stitching 33. The other end of attachment strap 29 is mounted to the vehicle by pivotable mounts 18 and 19. The length of attachment straps 29 can be varied in order to modify the position of inflatable structure 11.

The fourth preferred embodiment can be used in conjunction with any of the internal embodiments of the braided tube. It can also be used in conjunction with either the second or third preferred embodiments.

The foregoing disclosure of the preferred embodiments of the invention has been presented for the purposes of illustration and description. It is not intended to be exhaustive or to limit the invention to the precise form disclosed. In particular, the present invention may be used as a single or multiple tube configuration. The invention can be used in land, sea or air vehicles as well as in automobiles. For example, the present invention may be used in trains, trucks, buses, vans, boats, ships and aircraft. Many variations and modifications of the embodiments described herein will be obvious to one of ordinary skill in the art in light of the above disclosure. The scope of the invention is to be defined only by the claims appended hereto.

What is claimed is:

1. A safety system for protecting occupants of vehicles comprising:
   (a) a braided tube enclosing an inner bladder running the length of the tube, said tube having a first end, a second end, and an inner surface;

(b) said tube mounted proximate to said first end at a first position in the vehicle;

(c) said tube mounted proximate to said second end at a second position in the vehicle;

(d) means for generating gas flow into said inner bladder, thereby inflating the braided tube;

(e) crash sensor means connected to said means for generating gas, said crash sensor means being capable of initiating generation of gas flow into said inner bladder upon detection of an impact, wherein said tube in its uninflated state is substantially longer than the straight-line distance between said first and second positions in the vehicle, wherein upon inflation, said tube increases its diameter and decreases its length substantially such that said tube deploys under tension in a substantially straight line between the first and second positions in the vehicle.

2. The safety system of claim 1, wherein said inner bladder is comprised of a gas-retentive material.

3. The safety system of claim 1, wherein said inner bladder is comprised of an elastomeric material.

4. The safety system of claim 1, wherein said tube is pivotally mounted proximate said first end.

5. The safety system of claim 1, wherein said tube is pivotally mounted proximate said second end.

6. The safety system of claim 1, wherein said tube is pivotally mounted proximate said first end and pivotally mounted proximate said second end.

7. The safety system of claim 1, further comprising a strap attached to said first end for mounting.

8. The safety system of claim 1, further comprising a strap attached to said second end for mounting.

9. The safety system of claim 1, further comprising straps attached to said first end and to said second end for mounting.

10. The safety system of claim 1, wherein said braided tube comprises continuous fibers impregnated with a high-elongation elastomer.

11. The safety system of claim 1, wherein said inner bladder comprises at least one layer of an elastomeric material.

12. The safety system of claim 11, wherein said at least one layer is joined at a seam running the length of said bladder.

13. The safety system of claim 11, wherein said bladder is seamless.

14. The safety system of claims 11, 12 or 13 wherein said outer surface of said bladder is bonded to said inner surface of said braided tube.

15. The safety system of claim 1, wherein the diameter of said inner bladder is larger than the diameter of said braided tube such that said inner bladder is only partially inflated when said braided tube is fully deployed.

16. A safety system for protecting occupants of vehicles comprising:

(a) a braided tube enclosing an inner bladder running the length of the tube, said braided tube having a first end, a second end, and an inner surface;

(b) said braided tube mounted proximate to said first end to a first position in the vehicle;

(c) said tube mounted proximate to said second end to a second position in the vehicle;

(d) means for generating gas in said inner bladder, thereby inflating the braided tube, said inner bladder comprised of at least one layer of elastomeric material;

(e) crash sensor means connected to said means for generating gas, said crash sensor means being capable of initiating generation of gas flow into said inner bladder upon detection of an impact, wherein upon inflation of said inner bladder, said braided tube increases its diameter and decreases its length substantially such that said braided tube deploys under tension in a substantially straight line between the first and second positions in the vehicle.

17. The safety system of claim 16, wherein said inner bladder comprises a bonded seam running the length of the bladder.

18. The safety system of claim 17, wherein said inner bladder has an outer surface, and the outer surface of said inner bladder is bonded to the inner surface of the braided tube.

19. The safety system of claim 16, wherein the inner bladder is seamless.

20. The safety system of claim 19, wherein said inner bladder has an outer surface, and the outer surface of said inner bladder is bonded to the inner surface of the braided tube.

21. The safety system of claim 16, wherein the braided tube is attached to the first position by a pivotable mount.

22. The safety system of claim 16, wherein the braided tube is attached to the second position by a pivotable mount.

23. A safety system for protecting occupants of motor vehicles comprising:

(a) a braided tube enclosing an inner bladder running the length of the tube, said braided tube having a first end, a second end, and an inner surface;

(b) at least one attachment strap having a first end and a second end, the first end of said at least one attachment strap connected to the first end of the braided tube, the second end of said at least one attachment strap mounted to a first position in the vehicle;

(c) said tube mounted proximate to said second end to a second position in the vehicle;

(d) means for generating gas flow into said inner bladder, thereby inflating the braided tube, said inner bladder comprised of at least one layer of elastomeric material;

(e) crash sensor means connected to said means for generating gas, said crash sensor means being capable of initiating generation of gas flow into said inner bladder upon detection of an impact, wherein upon inflation of said inner bladder, said braided tube increases its diameter and decreases its length substantially such that said braided tube deploys under tension in a substantially straight line between the first and second positions in the vehicle.

24. The safety system of claim 23, wherein said inner bladder comprises a bonded seam running the length of the bladder.

25. The safety system of claim 24, wherein said inner bladder has an outer surface, and the outer surface of said inner bladder is bonded to the inner surface of the braided tube.

26. The safety system of claim 23, wherein the inner bladder is seamless.

27. The safety system of claim 26, wherein said inner bladder has an outer surface, and the outer surface of said inner bladder is bonded to the inner surface of the braided tube.

28. The safety system of claim 23, wherein said inner bladder comprises an upper layer and a lower layer of elastomeric material, and wherein the ends of said upper and lower layer are turned inward and sealed to each other by an adhesive.

29. The safety system of claim 28, wherein said braided tube comprises an upper layer and a lower layer, and the ends of said upper layer and said lower layer are bound together by stitching, thus forming the first end and the second end of the braided tube.

30. A safety system for protecting the occupants in a vehicle having a window opening and a first pillar and a second pillar on either side of the window opening comprising:

(a) a first tube having a first end and a second end;

(b) the first end of the first tube being pivotally mounted to the first pillar at a first position;

(c) the second end of the first tube being pivotally mounted to the second pillar at a second position, said first tube being stowed around a portion of the periphery of the window opening between the first pillar and the second pillar;

(d) means for generating gas in the first tube;

(e) crash sensor means connected to the means for generating gas flow into the first tube such that when the crash sensor detects an impact, it initiates generation of gas by the means for generating gas in the first tube;

(f) a second tube having a first end and a second end;

(g) the first end of the second tube being pivotally mounted to the first pillar at a third position; and (h) the second end of the second tube being pivotally mounted to the second pillar at a fourth position, said second tube being stowed around a portion of the periphery of the window opening between the first pillar and the second pillar;

wherein, upon inflation, the first tube and the second tube increase their diameter and decrease their length substantially, forming two semi-rigid members stretching under tension from the first pillar to the second pillar.

31. The safety system of claim 30, further comprising means for generating gas flow into the second tube.

32. The safety system of claim 31, wherein the means for generating gas flow into the second tube is at least one fluid connection between the first tube and the second tube.

33. The safety system of claim 30, further comprising means for generating gas flow into the second tube, said crash sensor means being connected to the means for generating gas in the second tube such that when the crash sensor detects an impact, it initiates generation of gas by the means for generating gas flow into the second tube.

34. The safety system of claim 30, further comprising a first fluid connection between the first tube and the second tube, said first fluid connection fluidly connecting the first end of the first tube to the first end of the second tube.

35. The safety system of claim 34, further comprising a second fluid connection between the first tube and the second tube, said second fluid connection fluidly connecting the second end of the first tube to the second end of the second tube.

36. The safety system of claim 30, further comprising means for equalizing pressure between the first tube and the second tube.

37. The safety system of claim 36, wherein the means for equalizing the pressure between the first tube and the second tube is at least one fluid connection between the first tube and the second tube.

38. The safety system of claim 30, wherein the first end of the first tube and the first end of the second tube are mounted to the first pillar using a single pivotable mount.

39. The safety system of claim 38, wherein the second end of the first tube and the second end of the second tube are mounted to the second pillar using a single pivotable mount.

40. An inflatable tubular structure comprising:

(a) a braided tube of continuous fibers, said fibers crossing each other at fiber crossing points and forming first and second angles at the fiber crossing points, the first angles having longitudinal bisectors and the second angles having circumferential bisectors;

(b) an inner bladder running the length of the braided tube;

(c) means for connecting said inner bladder to a source of inflating gas; and (d) means for mounting said braided tube at fixed positions on a vehicle, wherein when the braided tube is inflated and the diameter of the tube increases, the first angles increase and the second angles decrease, resulting in a substantial decrease of the length of the braided tube.

41. The inflatable tubular structure of claim 40, wherein said continuous fibers are selected from at least one of Kevlar, nylon, dacron and polyester fibers.

42. The inflatable tubular structure of claim 40, wherein the unconstrained length of the braided tube decreases by 20% to 50% upon inflation.

43. The inflatable tubular structure of claim 40, wherein prior to inflation the first angles are acute, and upon inflation of the unconstrained tubular structure the first angles become obtuse.

44. The inflatable tubular structure of claim 40, wherein the means for connecting said inner bladder to a source of inflating gas are means for connecting said inner bladder to a source for generating gas located inside the braided tube.

45. The inflatable tubular structure of claim 40, wherein the means for connecting said inner bladder to a source of inflating gas are means for connecting said inner bladder to a source located external to the braided tube.

46. The inflatable tubular structure of claim 40, wherein the inner bladder comprises a seam running the length of the bladder.

47. The inflatable tubular structure of claim 40, wherein the inner bladder is uniformly bonded to the inner surface of the braided tube.

48. The inflatable tubular structure of claim 40, wherein the ends of the inner bladder are flattened and sealed with an adhesive, and wherein the ends of the braided tube are flattened and bound together by stitching.

49. The inflatable tubular structure of claim 40, wherein said inner bladder is comprised of a gas-retentive material.

50. The inflatable tubular structure of claim 40, wherein said inner bladder is comprised of an elastomeric material.

* * * * *